US008811711B2

(12) United States Patent
Calman et al.

(10) Patent No.: US 8,811,711 B2
(45) Date of Patent: Aug. 19, 2014

(54) RECOGNIZING FINANCIAL DOCUMENT IMAGES

(75) Inventors: Matthew A. Calman, Charlotte, NC (US); Erik Stephen Ross, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 226 days.

(21) Appl. No.: 13/342,072

(22) Filed: Jan. 1, 2012

(65) Prior Publication Data

US 2012/0230577 A1 Sep. 13, 2012

Related U.S. Application Data

(60) Provisional application No. 61/450,213, filed on Mar. 8, 2011, provisional application No. 61/508,944, filed on Jul. 18, 2011.

(51) Int. Cl.
*G06K 9/00* (2006.01)
*G06Q 20/04* (2012.01)
(52) U.S. Cl.
CPC ........ *G06K 9/00442* (2013.01); *G06K 20/3223* (2013.01); *G06Q 20/042* (2013.01); *G06Q 20/0425* (2013.01)
USPC ........... 382/138; 382/135; 382/137; 382/139; 705/42; 705/14.25
(58) Field of Classification Search
CPC ...... G06Q 20/10; G06Q 20/108; G07F 19/00; G06K 9/00469; G07D 2207/00
USPC ......... 382/135, 137, 138, 139; 705/14.25, 44, 705/42
See application file for complete search history.

(56) References Cited

U.S. PATENT DOCUMENTS

| 6,996,263 | B2* | 2/2006 | Jones et al. | 382/135 |
|---|---|---|---|---|
| 7,016,532 | B2* | 3/2006 | Boncyk et al. | 382/165 |
| 7,155,228 | B2 | 12/2006 | Rappaport et al. | |
| 7,403,652 | B2 | 7/2008 | Boncyk et al. | |
| 7,412,081 | B2 | 8/2008 | Doi | |
| 7,424,303 | B2 | 9/2008 | Al-Sarawi | |
| 7,477,780 | B2 | 1/2009 | Boncyk et al. | |

(Continued)

OTHER PUBLICATIONS

International Search Report and Written Opinion, corresponding to International Patent Application No. PCT/US12/27890, dated Feb. 5, 2013.

(Continued)

*Primary Examiner* — Stephen R Koziol
*Assistant Examiner* — Shaghayegh Azima
(74) *Attorney, Agent, or Firm* — Michael A. Springs; Moore & Van Allen, PLLC; Andrew D. Gerschutz

(57) ABSTRACT

Embodiments of the invention are directed to methods, apparatus systems and computer program products that provide for using real-time video analysis for recognizing financial document images by capturing a real-time video stream using a mobile device, wherein the video stream features one or more financial documents, analyzing and correlating the images in the real-time video stream to the images necessary to process the financial document, providing notice to a user of additional images needed to process the financial document and communicating the information associated with the financial document to a financial institution to complete a transaction once sufficient images of the financial document have been captured to process the financial document.

31 Claims, 7 Drawing Sheets

(56) References Cited

U.S. PATENT DOCUMENTS

| | | | |
|---|---|---|---|
| 7,526,280 B2 | | 4/2009 | Jung et al. |
| 7,564,469 B2 | * | 7/2009 | Cohen .......................... 345/632 |
| 7,565,008 B2 | | 7/2009 | Boncyk et al. |
| 7,680,324 B2 | | 3/2010 | Boncyk et al. |
| 7,775,437 B2 | | 8/2010 | Cohen |
| 7,792,738 B2 | | 9/2010 | Channell |
| 7,881,529 B2 | | 2/2011 | Boncyk et al. |
| 7,899,243 B2 | | 3/2011 | Boncyk et al. |
| 7,899,252 B2 | | 3/2011 | Boncyk et al. |
| 7,912,785 B1 | * | 3/2011 | Kay ................................. 705/42 |
| 8,138,930 B1 | | 3/2012 | Heath |
| 8,290,237 B1 | * | 10/2012 | Burks et al. ................... 382/137 |
| 8,385,950 B1 | * | 2/2013 | Wagner et al. ................ 455/466 |
| 8,438,110 B2 | * | 5/2013 | Calman et al. .................. 705/44 |
| 2003/0064705 A1 | | 4/2003 | Desiderio |
| 2004/0021584 A1 | | 2/2004 | Hartz et al. |
| 2004/0024709 A1 | * | 2/2004 | Yu et al. .......................... 705/43 |
| 2006/0100951 A1 | | 5/2006 | Mylet et al. |
| 2007/0140595 A1 | | 6/2007 | Taylor et al. |
| 2008/0040278 A1 | | 2/2008 | DeWitt |
| 2008/0214210 A1 | | 9/2008 | Rasanen et al. |
| 2008/0268876 A1 | * | 10/2008 | Gelfand et al. ............... 455/457 |
| 2008/0307307 A1 | * | 12/2008 | Ciudad et al. ................. 715/719 |
| 2009/0005010 A1 | * | 1/2009 | Dote et al. .................. 455/412.1 |
| 2009/0094125 A1 | | 4/2009 | Killian et al. |
| 2009/0102859 A1 | | 4/2009 | Athsani et al. |
| 2009/0140839 A1 | | 6/2009 | Bishop et al. |
| 2009/0144164 A1 | | 6/2009 | Wane et al. |
| 2009/0171850 A1 | | 7/2009 | Yuval |
| 2009/0182748 A1 | | 7/2009 | Walker |
| 2009/0185241 A1 | * | 7/2009 | Nepomniachtchi ........... 358/474 |
| 2009/0204511 A1 | | 8/2009 | Tsang |
| 2009/0250515 A1 | | 10/2009 | Todd et al. |
| 2010/0185529 A1 | | 7/2010 | Chesnut et al. |
| 2010/0250581 A1 | | 9/2010 | Chau |
| 2011/0022540 A1 | | 1/2011 | Stern et al. |
| 2011/0034176 A1 | | 2/2011 | Lord et al. |
| 2011/0091092 A1 | * | 4/2011 | Nepomniachtchi et al. .. 382/139 |
| 2011/0106845 A1 | * | 5/2011 | Lipson et al. ................. 707/769 |
| 2011/0119155 A1 | | 5/2011 | Hammad et al. |
| 2011/0202466 A1 | | 8/2011 | Carter |
| 2011/0280450 A1 | * | 11/2011 | Nepomniachtchi et al. .. 382/112 |
| 2012/0179609 A1 | * | 7/2012 | Agarwal et al. ................ 705/44 |
| 2012/0232976 A1 | * | 9/2012 | Calman et al. ............ 705/14.25 |
| 2013/0155474 A1 | * | 6/2013 | Roach et al. ................... 358/505 |

OTHER PUBLICATIONS

International Search Report and Written Opinion of the International Searching Authority for International Application No. PCT/US2012/028008 mailed Jun. 4, 2012.
Pending U.S. Appl. No. 13/342,041, filed Jan. 1, 2012.
Pending U.S. Appl. No. 13/342,042, filed Jan. 1, 2012.
Pending U.S. Appl. No. 13/342,044, filed Jan. 1, 2012.
Pending U.S. Appl. No. 13/342,045, filed Jan. 1, 2012.
Pending U.S. Appl. No. 13/342,046, filed Jan. 1, 2012.
Pending U.S. Appl. No. 13/342,047, filed Jan. 1, 2012.
Pending U.S. Appl. No. 13/342,048, filed Jan. 1, 2012.
Pending U.S. Appl. No. 13/342,050, filed Jan. 1, 2012.
Pending U.S. Appl. No. 13/342,051, filed Jan. 1, 2012.
Pending U.S. Appl. No. 13/342,052, filed Jan. 1, 2012.
Pending U.S. Appl. No. 13/342,053, filed Jan. 1, 2012.
Pending U.S. Appl. No. 13/342,055, filed Jan. 1, 2012.
Pending U.S. Appl. No. 13/342,056, filed Jan. 1, 2012.
Pending U.S. Appl. No. 13/342,057, filed Jan. 1, 2012.
Pending U.S. Appl. No. 13/342,058, filed Jan. 1, 2012.
Pending U.S. Appl. No. 13/342,059, filed Jan. 1, 2012.
Pending U.S. Appl. No. 13/342,060, filed Jan. 1, 2012.
Pending U.S. Appl. No. 13/342,061, filed Jan. 1, 2012.
Pending U.S. Appl. No. 13/342,062, filed Jan. 1, 2012.
Pending U.S. Appl. No. 13/342,063, filed Jan. 1, 2012.
Pending U.S. Appl. No. 13/342,064, filed Jan. 1, 2012.
Pending U.S. Appl. No. 13/342,065, filed Jan. 1, 2012.
Pending U.S. Appl. No. 13/342,066, filed Jan. 1, 2012.
Pending U.S. Appl. No. 13/342,068, filed Jan. 1, 2012.
Pending U.S. Appl. No. 13/342,069, filed Jan. 1, 2012.
Pending U.S. Appl. No. 13/342,070, filed Jan. 1, 2012.
Pending U.S. Appl. No. 13/342,071, filed Jan. 1, 2012.
Pending U.S. Appl. No. 13/365,996, filed Feb. 3, 2012.
International Search Report and Written Opinion of the International Searching Authority for International Application No. PCT/US2012/028036 mailed Jun. 4, 2012.
ISA/US Commissioner for Patents, PCT International Search Report and the Written Opinion of the International Searching Authority for International Application No. PCT/US12/48697 date of completion Sep. 24, 2012, date of mailing Oct. 12, 2012.
International Preliminary Report on Patentability for International Patent Application PCT/US2012/027912, Mailed Sep. 19, 2013.
International Preliminary Report on Patentability for International Patent Application PCT/US2012/028036, Mailed Sep. 19, 2013.
International Preliminary Report on Patentability for International Patent Application PCT/US2012/028008, Mailed Sep. 19, 2013.
International Preliminary Report on Patentability for International Patent Application PCT/US2012/027890, Mailed Sep. 19, 2013.
International Preliminary Report on Patentability for International Patent Application PCT/US2012/027892, Mailed Sep. 19, 2013.
International Preliminary Report on Patentability for International Application No. PCT/US2012/048697 issued on Feb. 4, 2014.

* cited by examiner

RECOGNIZING FINANCIAL DOCUMENT IMAGES

CROSS-REFERENCE TO RELATED APPLICATIONS

This application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/508,944, filed Jul. 18, 2011, entitled "Recognizing Financial Document Images," the entirety of each of which is incorporated herein by reference.

BACKGROUND

Modern mobile devices, such as smart phones and the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have additional features that are becoming increasingly more common as standardized features. Such features include, but are not limited to, location-determining devices, such as Global Positioning System (GPS) devices; sensor devices, such as accelerometers and touch pads; and high-resolution video cameras.

As the hardware capabilities of such mobile devices have increased, so to have the applications (i.e., software) that rely on the hardware advances. One such example of innovative software is a category known as augmented reality (AR), or more generally referred to as mediated reality. One such example of an AR application platform is Layar, available from Layar, Amsterdam, the Netherlands.

The Layar platform technology analyzes real-time video data, location data, compass direction data and the like in combination with information related to the objects, locations or the like in the video stream to create browse-able "hotspots" or "tags" that are superimposed on the mobile device display, resulting in an experience described as "reality browsing".

Presently, most financial institutions require their customers to visit traditional deposit locations, such as banking centers, automated teller machines (ATMs), and the like, in order to deposit cash, checks, and/or other deposit items. However, traveling to and from a traditional deposit location in order to make a deposit is increasingly viewed by financial institution customers as burdensome, time-consuming, and wasteful.

If a financial institution has a mechanism in place to capture deposit items remotely, it is done with the capture of a single image and/or static image and the image is not actively processed. This results in delays in the processing of transactions as deficiencies in the captured images are not discovered as the image is being captured and the financial institution and the customer will be burdened with having to verify and correct the originally captured image.

Therefore, a need exists to implement real-time video analysis, i.e., AR or the like, to assist in the recognition of financial documents to enable financial institution customers to engage in deposit transactions in ways that are easier, more efficient, and less costly.

SUMMARY

The following presents a simplified summary of one or more embodiments of the present invention in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus systems and computer program products are described herein that provide for using real-time video analysis, such as AR or the like to assist the user with the recognition of financial documents. Through the use of real-time image object recognition, magnetic ink character recognition (MICR) lines, endorsements, watermarks, account numbers, payee identity, payor identity, financial institution identity, deposit amount, appearance of a deposit item, type of a deposit item, text, shapes, logos, colors, locations and other features that can be recognized in a real-time video stream to identify, authenticate and process financial documents.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

Some embodiments of the present invention provide a method wherein a mobile device is used to capture a real-time video stream that includes one or more images of a financial document. A processor analyzes the real-time video stream to identify images that may be used to process the financial document. The processor then correlates the collected images of the financial document to the information needed to process the financial document. If additional images are needed to process the financial document, the mobile device provides notice to the user. Once sufficient images of the financial document have been captured the mobile device communicates the information associated with the financial document to a financial institution to complete a transaction.

In some embodiments, the financial document is a check, cash, draft, bond, share, bill of exchange, future, option, money order, promissory note, deposit slip, security, stock, invoice or statement. In certain embodiments, the notice to the user that additional images are needed to process the financial document comprises instructions to the user of how to manipulate the mobile device to capture the required images. The transaction may be a deposit, transfer, sale, payment or exchange.

In some embodiments, the method for recognizing financial document images includes the additional step of presenting one or more indicators via the display of the mobile device, each indicator being associated with an image that may be used to process the financial document. In certain embodiments, the one or more indicators are interactive allowing the user to access additional information associated with the image or take an action using the information associated with the image. In some such embodiments, the action taken may be making a payment, transferring funds to a financial institution or depositing funds with a financial institution. The indicators may also be a representation of the amount of images captured as compared to the number of images remaining to be captured before the financial document may be processed.

In certain embodiments, the method also includes the additional step of creating a substitute image, such as an enhanced payment order, using the captured images of the financial document. In such embodiments, communicating the information associated with the financial document to a financial institution comprises communicating the substitute image to the financial institution to complete a transaction.

Embodiments of the invention also provide an apparatus where the apparatus has a device for capturing a real-time video stream that includes one or more images of a financial document, a display operably connected to the device, a processor operably connected to the device and the display and configured to analyze the real-time video stream to identify images that may be used to process the financial document and correlate the images to the images needed to process the document. The processor is also configured to provide notice to the user of additional images needed to process the financial document. Such an apparatus may also include a communication device operably connected to the processor for communicating information associated with the financial document to a financial institution to complete a transaction once sufficient images of the financial document have been captured to process the financial document.

In some embodiments of the apparatus, the images of the financial document being captured by the device are from a check, cash, draft, bond, share, bill of exchange, future, option, money order, promissory note, deposit slip, security, invoice or statement. The notice provided to the user by the apparatus may comprise instructions to the user of how to manipulate the device to capture the required images. The relevant transaction may be a deposit, transfer, sale, payment or exchange.

In certain embodiments of the apparatus, the processor is further configured to present one or more indicators via the display, wherein each indicator is associated with an image that may be used to process the financial document. In certain embodiments, the one or more indicators are interactive allowing the user to access additional information associated with the image or take an action using the information associated with the image. The action may include making a payment, transferring funds to a financial institution or depositing funds with a financial institution. The indicators may also be a representation of the amount of images captured as compared to the number of images remaining to be captured before the financial document may be processed.

In further embodiments of the apparatus, the processor is also configured to create a substitute image using the captured images of the financial document. The substitute image may be an enhanced payment order. The substitute image may then be communicated, using the communication device, to a financial institution to complete a transaction.

Embodiments of the invention also provide a computer program product comprising a non-transitory computer-readable medium having computer-executable code stored thereon. In one embodiment, the computer-executable code includes: a first code portion stored in memory and configured to capture, via a mobile device, a real-time video stream that includes one or more images of a financial document, a second code portion configured to analyze the real-time video stream to identify images that may be used to process the financial document; a third code portion configured to correlate the captured images of the financial document to the information needed to process the financial document; a fourth code portion configured to provide notice to the user of additional images needed to process the financial document; and a fifth code portion configured to communicate instructions to a financial institution to complete a transaction once sufficient images of the financial document have been captured to process the financial document.

In other embodiments the computer program product will include a sixth code portion stored in the memory and configured to present one or more indicators, via a display, each indicator being associated with an image that may be used to process the financial document. Some embodiments will also include a seventh code portion that is stored in the memory and configured to create a substitute image using the captured images of the financial document. In such embodiments, communicating the information associated with the financial document to a financial institution comprises communicating the substitute image to the financial institution to complete the transaction.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
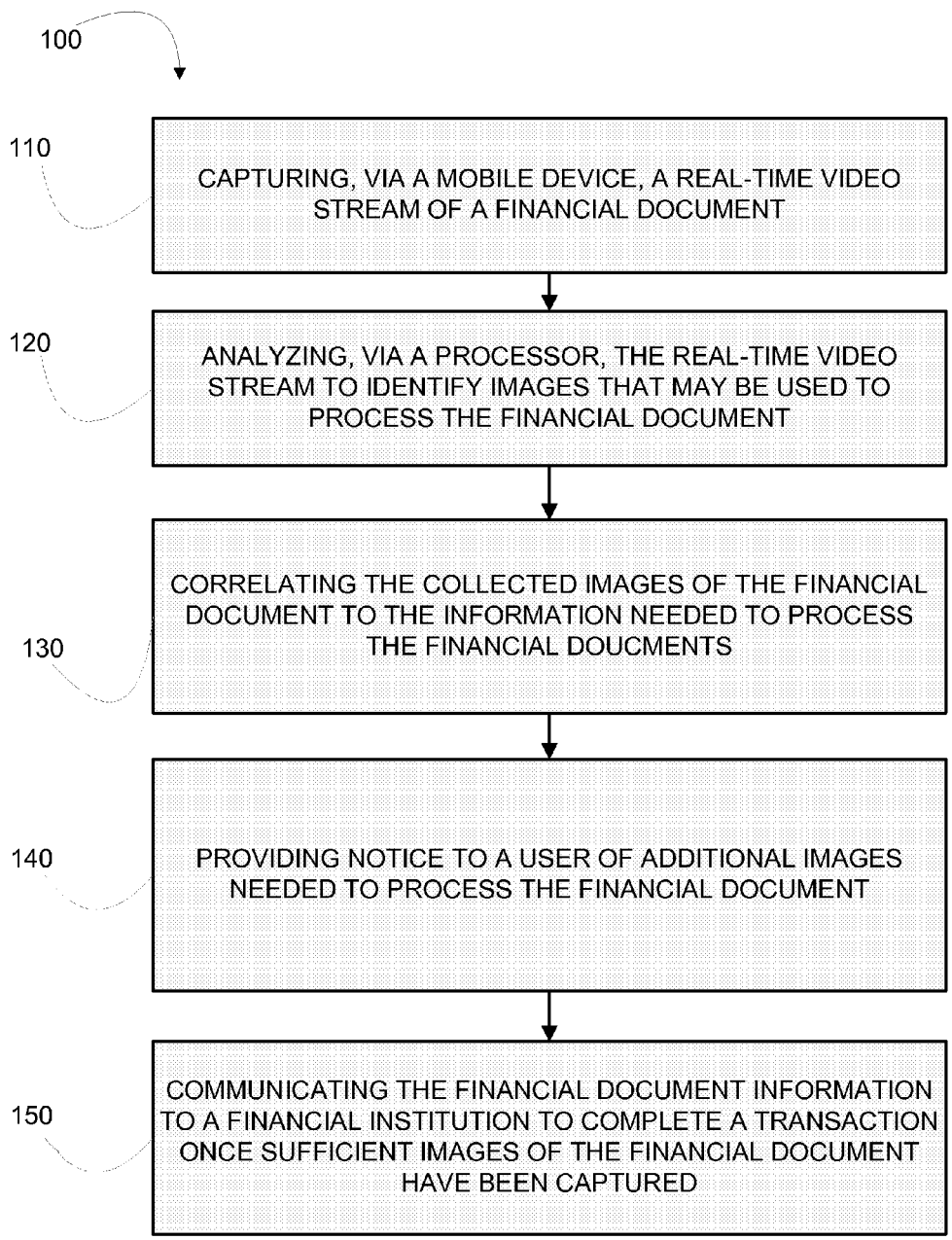

Having thus described embodiments of the invention in general terms, reference will now be made to the accompanying drawings, which are not necessarily drawn to scale, and wherein:

FIG. 1 is a flow diagram illustrating a process flow of an apparatus or system for recognizing financial document images, in accordance with an embodiment of the invention.

Figure 2:
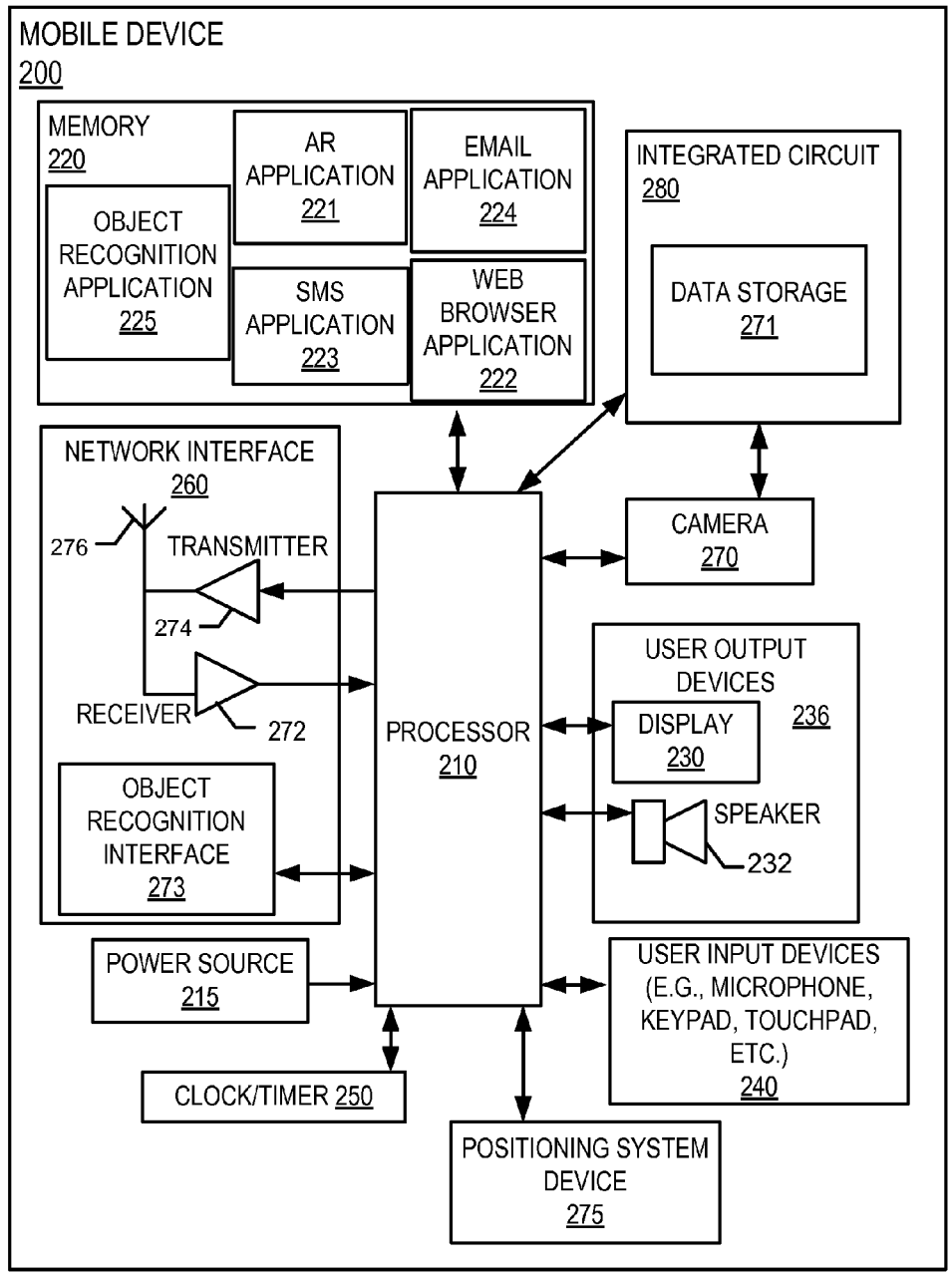
Figure 3:
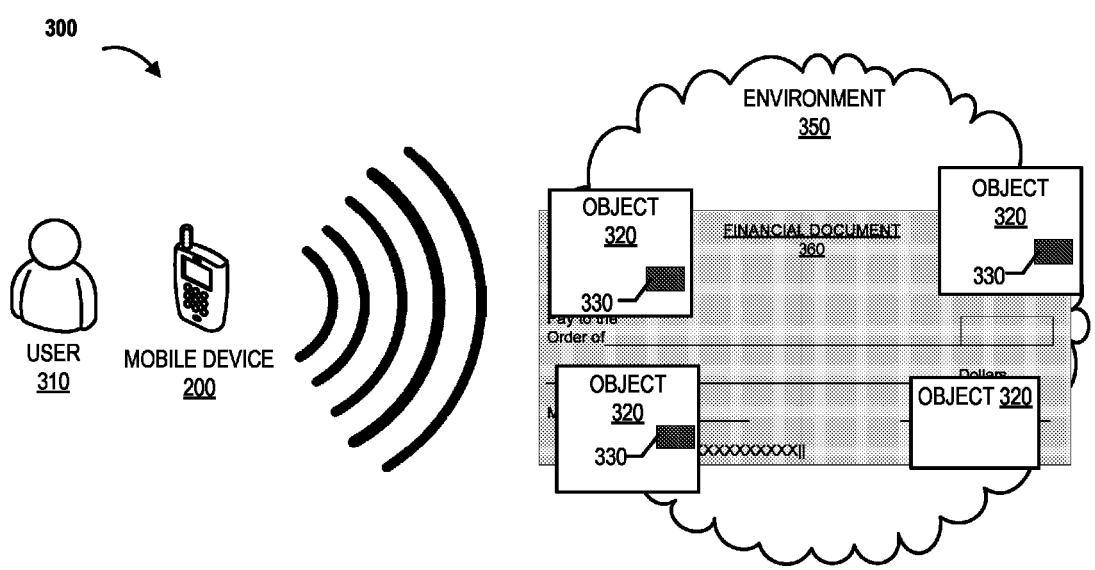
Figure 4:
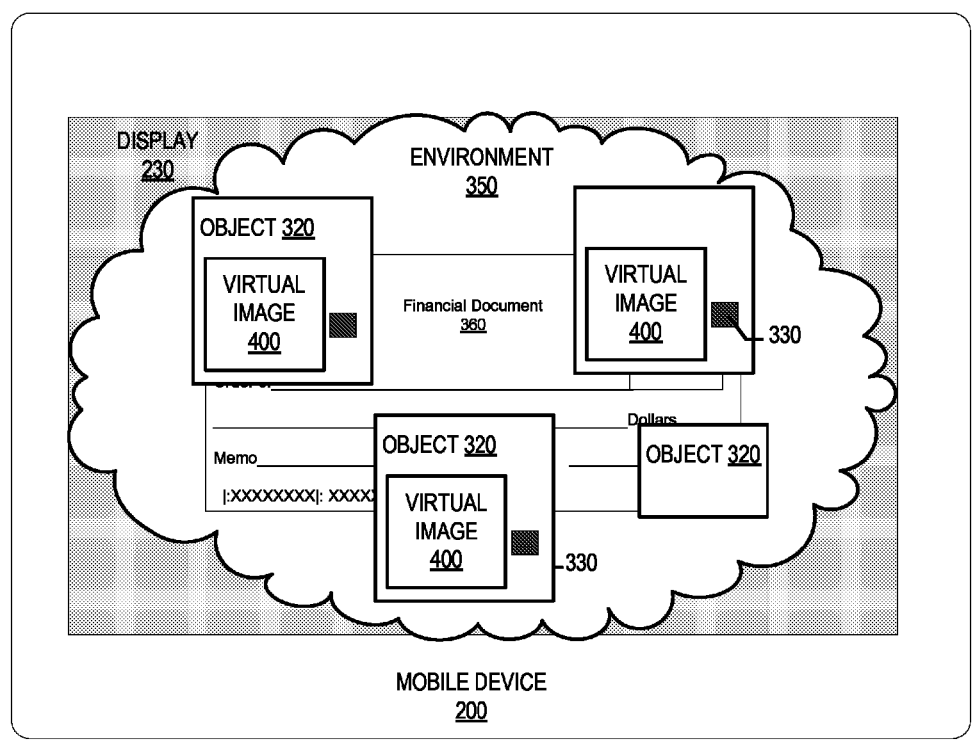
Figure 5:
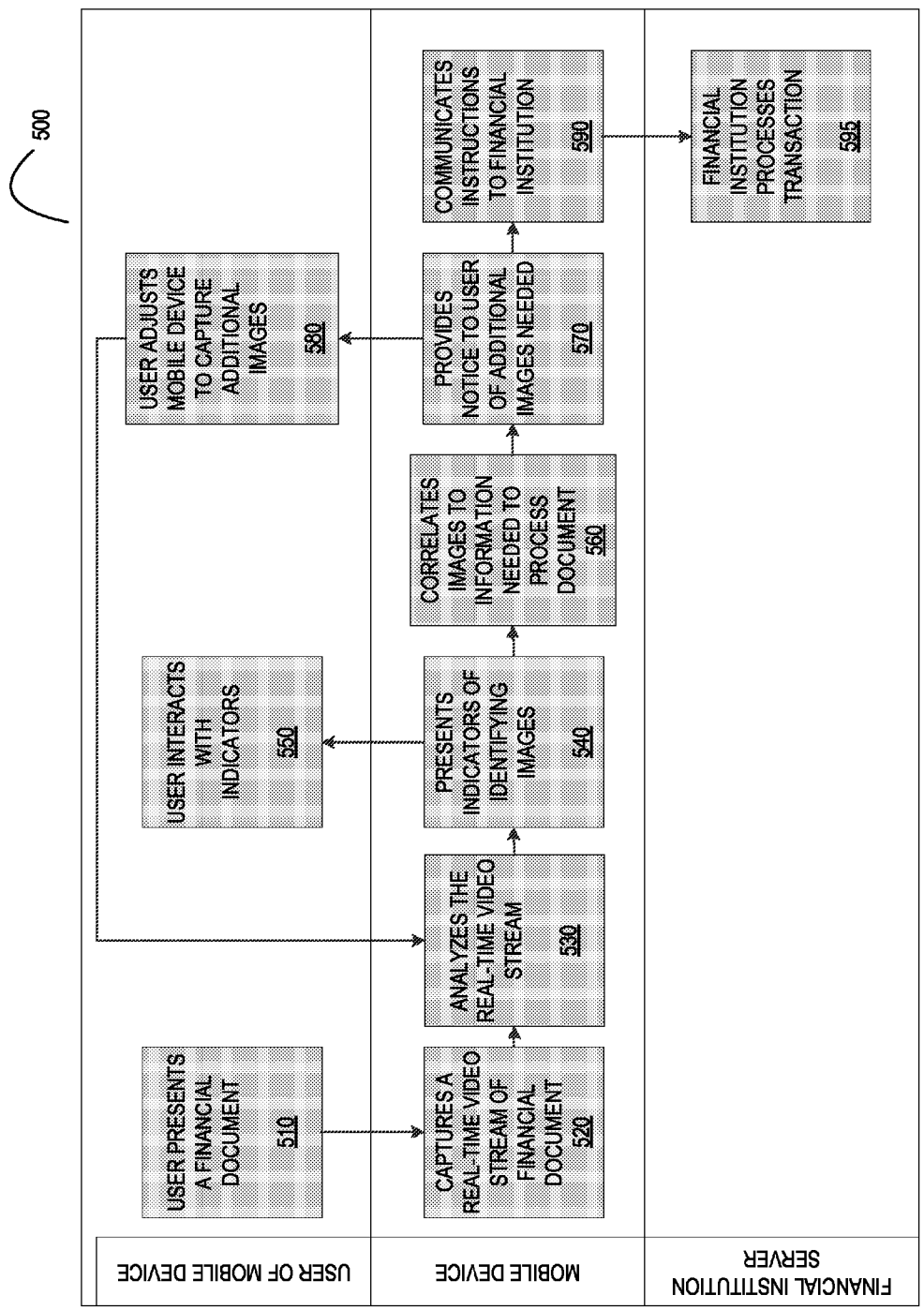
Figure 6:
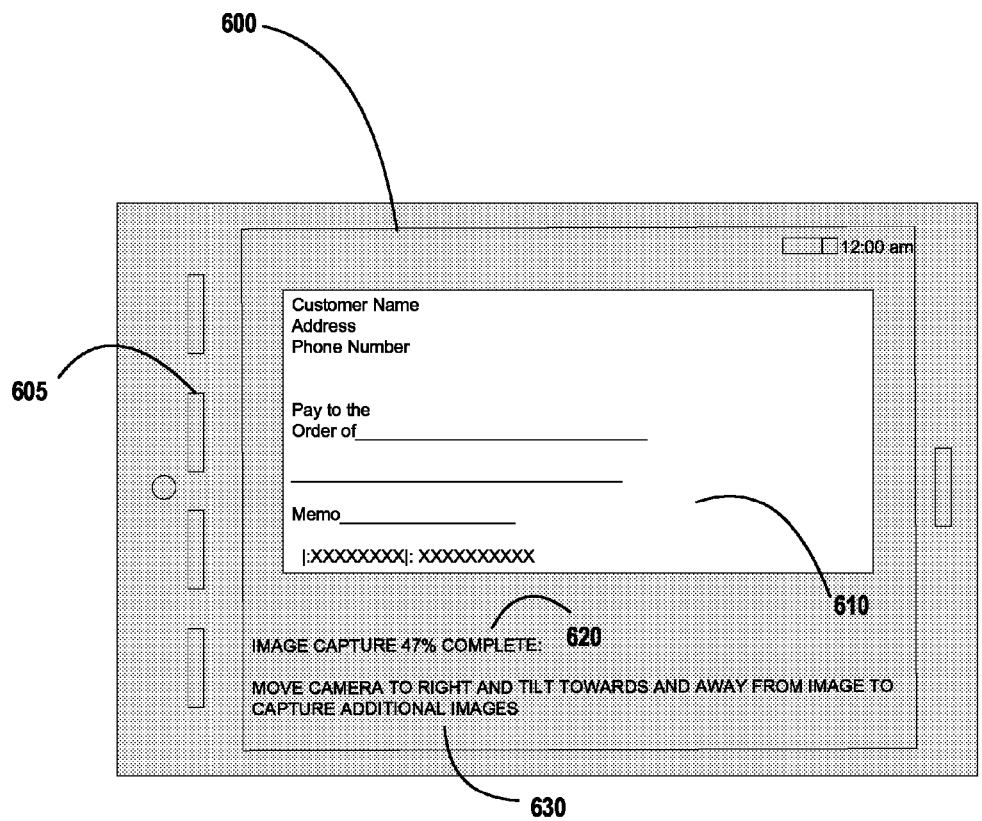
Figure 7:
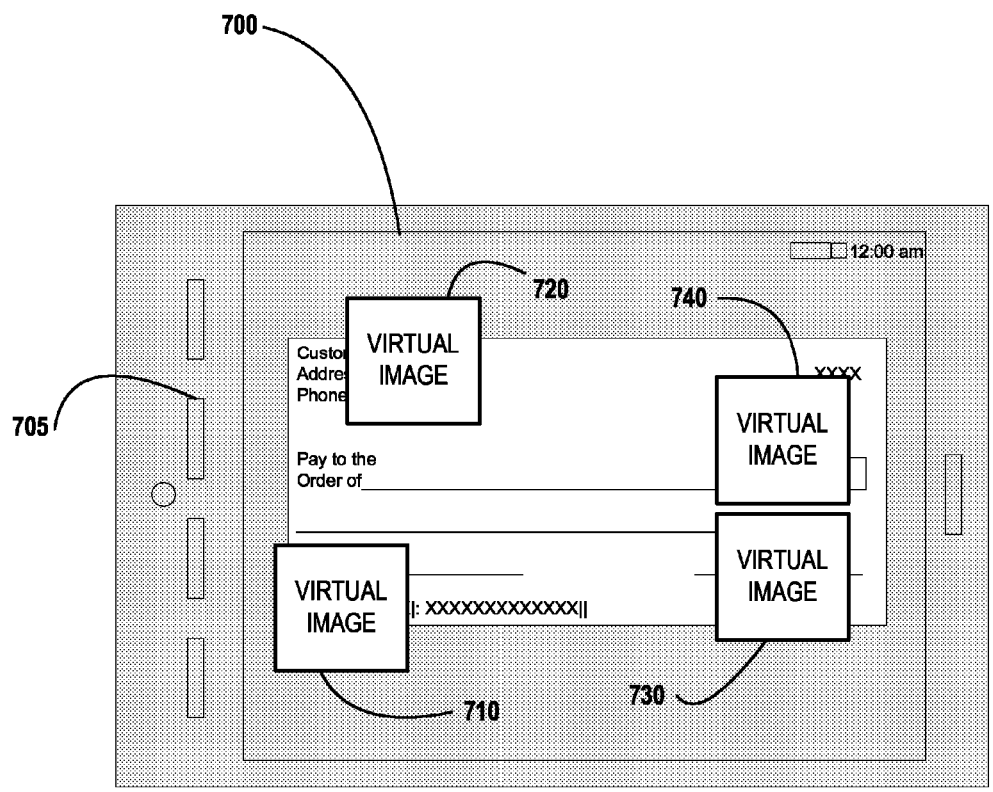

FIG. 2 is a block diagram illustrating a mobile device, in accordance with an embodiment of the invention;

FIG. 3 is a block diagram illustrating an AR environment, in accordance with an embodiment of the invention;

FIG. 4 is a block diagram illustrating a mobile device, in accordance with an embodiment of the invention;

FIG. 5 is a flow diagram illustrating a process flow for an apparatus or system for recognizing financial document images, in accordance with an embodiment of the invention;

FIG. 6 illustrates an exemplary display page of a user interface for receiving notice of additional images needed to process a financial document, in accordance with an embodiment of the invention; and FIG. 7. illustrates an exemplary display page of a user interface for displaying one or more indicators associated with a financial document, in accordance with an embodiment of the invention

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, methods, systems, computer programs and the like are herein disclosed that provide for using real-time video analysis, such as AR or the like to assist the user with the recognition of financial document images.

The methods, systems, computer programs and the like disclosed herein use real-time vision object recognition to identify, magnetic ink character recognition (MICR) lines, endorsements, watermarks, account numbers, payee identity, payor identity, financial institution identity, deposit amount, appearance of a deposit item, type of a deposit item, text, shapes, logos, colors, locations and other features that can be recognized in a real-time video stream to identify, authenticate and process financial documents. Once the financial document is sufficiently identified the information is communicated to a financial institution to complete a transaction.

It will be understood, that "financial document" or "financial instrument" as used herein refers to any document that has a monetary value or represents a legally enforceable agreement between two or more parties regarding a right to payment of money or the obligation to pay money. Financial documents include, but are not limited to checks, cash, drafts, bonds, shares, bills of exchange, futures, options, money orders, promissory notes, deposit slips, securities, invoices, statements and the like.

While embodiments discussed herein are generally described with respect to "real-time video streams" or "real-time video" it will be appreciated that the video stream may be captured and stored for later viewing and analysis. Indeed, in some embodiments video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take multiple still pictures of a financial document to be analyzed immediately or at a later time. Embodiments in which real-time video, recorded video or still pictures are analyzed are contemplated herein.

FIG. 1 illustrates a general process flow 100 of a method for recognizing financial document images, in accordance with an embodiment of the invention. As represented by block 110 a mobile device is used to capture a real-time video stream, wherein one or more images of a financial document are present. As represented by block 120 a processor analyzes the real-time video stream to identify images that may be used to process the financial document. The processor then correlates the collected images of the financial document to the information needed to process the financial document, as represented by block 130. As represented by block 140, if additional images are needed to process the financial document the mobile device provides notice to the user. Block 150 illustrates that once sufficient images of the financial document have been captured to process the financial documents, the mobile device communicates the information to a financial institution to complete a transaction. Embodiments of the process 100, and systems and apparatus for performing the process 100, are described in greater detail below with reference to FIGS. 1-7.

FIG. 2 illustrates an embodiment of a mobile device 200 that may be configured to execute object recognition and AR functionality, in accordance with specific embodiments of the present invention. A "mobile device" 200 may be any mobile communication device, such as a cellular telecommunications device (i.e., a cell phone or mobile phone), personal digital assistant (PDA), smartphone, a mobile Internet accessing device, or other mobile device including, but not limited to portable digital assistants (PDAs), pagers, mobile televisions, gaming devices, laptop computers, tablet computers, cameras, video recorders, audio/video players, radios, GPS devices, and any combination of the aforementioned, or the like.

The mobile device 200 may generally include a processor 210 communicably coupled to such components as a memory 220, user output devices 236, user input devices 240, a network interface 260, a power source 215, a clock or other timer 250, a camera 270, a positioning system device 275 (e.g., a Global Positioning System (GPS) device), one or more integrated circuits 280, etc.

The processor 210, and other processors described herein, may generally include circuitry for implementing communication and/or logic functions of the mobile device 200. For example, the processor 210 may include a digital signal processor device, a microprocessor device, and various analog to digital converters, digital to analog converters, and/or other support circuits. Control and signal processing functions of the mobile device 200 may be allocated between these devices according to their respective capabilities. The processor 210 thus may also include the functionality to encode and interleave messages and data prior to modulation and transmission. The processor 210 may additionally include an internal data modem. Further, the processor 210 may include functionality to operate one or more software programs or applications, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like.

The processor 210 may also be capable of operating applications, such as an object recognition application 225. The object recognition application 225 may be downloaded from a server and stored in the memory 220 of the mobile device 200. Alternatively, the object recognition application 225 may be pre-installed and stored in a memory in the integrated circuit 280 or operated directly from a website operably linked to the mobile device 200 through the network interface 260. In embodiments, where the object recognition application 225 is pre-installed or run from a website, the user may not need to download the object recognition application 225 from a server.

The integrated circuit 280 may include the necessary circuitry to provide the object recognition functionality to the mobile device 200. Generally, the integrated circuit 280 will include data storage 271 which may include data associated with the objects within a real-time video stream that the object recognition application 225 identifies as having certain marker(s) (discussed in relation to FIG. 3). The integrated circuit 280 and/or data storage 271 may be an integrated circuit, a microprocessor, a system-on-a-chip, a microcontroller, or the like. As discussed above, in one embodiment, the integrated circuit 280 may provide the AR functionality to the mobile device 200.

Of note, while FIG. 2 illustrates the integrated circuit 280 as a separate and distinct element within the mobile device 200, it will be apparent to those skilled in the art that the integrated circuit 280 functionality may be incorporated within other elements in the mobile device 200. For instance, the functionality of the integrated circuit 280 may be incorporated within the mobile device memory 220 and/or the processor 210. In a particular embodiment, the functionality of the integrated circuit 280 is incorporated in an element within the mobile device 200 that provides object recognition capabilities to the mobile device 200. Moreover, the functionality may be part of the firmware of the mobile device 200. Still further, the integrated circuit 280 functionality may be included in a removable storage device such as an SD card or the like.

The processor 210 may be configured to use the network interface 260 to communicate with one or more other devices on a network. In this regard, the network interface 260 may include an antenna 276 operatively coupled to a transmitter 274 and a receiver 272 (together a "transceiver"). The processor 210 may be configured to provide signals to and receive signals from the transmitter 274 and receiver 272, respectively. The signals may include signaling information in accordance with the air interface standard of the applicable cellular system of the wireless telephone network that may be part of the network. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 200 may also be configured to operate in accordance with non-cellular communication mechanisms, such as via a wireless local area network (WLAN) or other communication/data networks.

The network interface 260 may also include an object recognition interface 273 in order to allow a user to execute some or all of the above-described processes with respect to the object recognition application 225 and/or the integrated circuit 280. The object recognition interface 273 may have access to the hardware, e.g., the transceiver, and software previously described with respect to the network interface 260. Furthermore, the object recognition interface 273 may have the ability to connect to and communicate with an external data storage on a separate system within the network as a means of recognizing the object(s) in the video stream.

As described above, the mobile device 200 may have a user interface that includes user output devices 236 and/or user input devices 240. The user output devices 236 may include a display 230 (e.g., a liquid crystal display (LCD) or the like) and a speaker 232 or other audio device, which are operatively coupled to the processor 210. The user input devices 240, which may allow the mobile device 200 to receive data from a user 310, may include any of a number of devices allowing the mobile device 200 to receive data from a user 310, such as a keypad, keyboard, touch-screen, touchpad, microphone, mouse, joystick, stylus, other pointer device, button, soft key, and/or other input device(s).

The mobile device 200 may further include a power source 215. Generally, the power source 215 is a device that supplies electrical energy to an electrical load. In one embodiment, power source 215 may convert a form of energy such as solar energy, chemical energy, mechanical energy, etc. to electrical energy. Generally, the power source 215 in the mobile device 200 may be a battery, such as a lithium battery, a nickel-metal hydride battery, or the like, that is used for powering various circuits, e.g., the transceiver circuit, and other devices that are used to operate the mobile device 200. Alternatively, the power source 215 may be a power adapter that can connect a power supply from a power outlet to the mobile device 200. In such embodiments, a power adapter may be classified as a power source "in" the mobile device.

The mobile device 200 may also include a memory 220 operatively coupled to the processor 210. As used herein, memory may include any computer readable medium configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory may additionally or alternatively include an electrically erasable programmable read-only memory (EEPROM), flash memory or the like.

The memory 220 may store any of a number of applications or programs which comprise computer-executable instructions/code executed by the processor 210 to implement the functions of the mobile device 200 described herein. For example, the memory 220 may include such applications as an AR application 221 (described herein in relation to FIG. 4), a web browser application 222, an SMS application 223, an email application 224, an object recognition application 225 etc.

Referring to FIG. 3, a block diagram illustrating an object recognition experience 300 in which a user 310 utilizes the mobile device 200 to capture real-time video of an environment 350 that includes at least one financial document 360 is shown. The user 310 may be, without limitation, an individual, for example a customer of a financial institution seeking to perform a remote deposit, a merchant seeking to verify a financial document as part of a transaction, a financial institution, or the like. As denoted earlier, the mobile device 200 may be any mobile communication device. The mobile device 200 has the capability of capturing real-time video of the surrounding environment 350. The real-time video capture may be by any means known in the art. In one particular embodiment, the mobile device 200 is a mobile telephone equipped with a camera 270 capable of video capture.

The environment 350 includes at least one financial document 360. Within the document, or the document considered as a whole, are a number of objects 320. Some of such objects 320 may include a marker 330 identifiable to the mobile device 200, in some embodiments through an object recognition application that is executed on the mobile device 200 or within the wireless network. A marker 330 may be any type of marker that is a distinguishing feature that can be interpreted by the mobile device 200 to identify the specific object 320 or the financial document 360 as a whole. For instance in identifying a financial document, a marker 330 may be MICR lines, and endorsement, watermarks, account numbers, payee identity, payor identity, financial institution identity, deposit amount, appearance of a deposit item, size of the financial instrument, other text, logos, shapes, colors, etc. Moreover, the marker 330 may be a sensor, transmitter, chip, radio frequency identification (RFID) tag, or the like, embedded or otherwise incorporated in the financial document. The marker 330 may be any size, shape, etc. Indeed, in some embodiments, the marker 330 may be very small relative to the object 320 such as a watermark or a security strip in a type of currency, whereas, in other embodiments, the marker 330 may be the entire object 320, such as the size, ratio and proportion of a check.

The marker 330 may also be or include customer data maintained by a financial institution or merchant, such as transactional data, account history data and biographical data. For example, the mobile device 200 may capture a video stream or a financial instrument, such as a check, determine from the image that the check belongs to a customer of the financial institution, correlate the check number and amount to a transaction in the customer's transactional history data to verify the authenticity of the check. Similarly, the mobile device 200 may capture an image of the endorsement line of a financial document and compare the endorsement to a signature on file with the financial institution. In such cases, the customer data serves as one of the markers 330 used to process the financial document.

In some embodiments, the mobile device accesses one or more servers, networks, applications and/or the like in order to retrieve and/or search for information useful in performing object recognition. In some embodiments, the mobile device accesses another application by way of an application programming interface or API. In this regard, the mobile device may quickly search and/or retrieve information from the other program without requiring additional authentication steps or other gateway steps.

In some embodiments, the mobile device 200 accesses one or more databases or datastores (not shown) to search for and/or retrieve information related to the object 320 and/or marker 330. In some embodiments, the mobile device 200 accesses one or more datastores local to the mobile device 200 and in other embodiments, the mobile device 200 accesses datastores remote to the mobile device. In some embodiments, the mobile device 200 accesses both a memory and/or datastore local to the mobile device 200 as well as a datastore remote from the mobile device 200.

In some embodiments, the marker 330 is not actually a feature associated with the financial document 360. For instance, the marker 330 may be some type of identifiable feature, such as objects, text, locations and other features that indicate that the object 320 may be used to process the financial document 360. The marker 330 may be anything that enables the mobile device 200 to interpret to a desired confidence level what the object 320 is. For example, the mobile device 200 may capture a video of a financial document 360, collect the user's position using the positioning system device 275 and correlate that position to the address of a customer's residence or place of business. The mobile device 200 may then also capture a real-time video of a signature being applied to the financial document by someone writing with his left hand, which is consistent with the customer's biographical data maintained by the financial institution, and conclude that the signature on the financial document belongs to the customer and is sufficient to process the financial document. Accordingly, the markers 330 associated with the location of where the signature was applied and the individual's biographical data were sufficient to identify images of the financial document that could be used to process the financial document without relying on the markers 330 of the financial document.

While FIG. 3 illustrates that the objects 320 with markers 330 only include a single marker 330, it will be appreciated that the object 320 may have any number of markers 330 with each equally capable of identifying the object 320. Similarly, multiple markers 330 may be identified by the mobile device 200 such that the combination of the markers 330 may be utilized to identify the object 320. For example, the mobile device 200 may utilize the markers 330 of the image of a routing number from a check and text printed on the check to identify the issuing financial institution.

In some embodiments, an marker 330 may be the location of the object 320. In such embodiments, the mobile device 200 may utilize GPS software to determine the location of the user 310. As noted above, a location-based marker 330 could be utilized in conjunction with other non-location-based markers 330 identifiable and recognized by the mobile device 200 to identify the object 320. However, in some embodiments, a location-based marker 330 may be the only marker 330. For instance, in such embodiments, the mobile device 200 may utilize GPS software to determine the location of the user 310 and a compass device or software to determine the direction or tilt of the mobile device 200 in order to identify the object 320. In still further embodiments, the mobile device 200 does not utilize any GPS data in the identification. In such embodiments, markers 330 utilized to identify the object 320 are not location-based.

FIG. 4 illustrates the mobile device 200 wherein the user 310 has executed an object recognition application 225 and an AR application 221 and a real-time video capture device (e.g., camera 270) is utilized to display the surrounding environment 350, which includes a financial document 360, on the display 230 of the mobile device 200. The mobile device 200 is configured to utilize markers 330 to identify objects 320, for example payee information, that may be used to process the financial document. In some embodiments of the invention, as shown in FIG. 4, the mobile device may indicate to the user 310 identified objects 320 by displaying a virtual image 400 on the mobile device display 230. As illustrated, if an object 320 does not have any markers 330 (or insufficient markers 330 to yield object identification), the object 320 will be displayed without an associated virtual image 400.

The object recognition application 225 may use any type of means in order to identify desired objects 320. For instance, the object recognition application 225 may utilize one or more pattern recognition algorithms to analyze objects in the financial document 360 and compare with markers 330 in data storage 271 which may be contained within the mobile device 200 (such as within integrated circuit 280) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 320 within the real-time video stream, in some embodiments, the AR application 221 is configured to superimpose a virtual image 400 on the mobile device display 230. The virtual image 400 is generally a tab or link displayed such that the user 310 may "select" the virtual image 400 and retrieve information related to the identified object. The information may include any desired information associated with the selected object and may range from basic information to greatly detailed information. In some embodiments, the virtual image 400 may provide the user 310 with an Internet hyperlink to further information on the object 320. The information may include, for example, all types of media, such as text, images, clipart, video clips, movies, or any other type of information desired. In yet other embodiments, the information related to the identified object 320 may be visualized by the user 310 without "selecting" the virtual image 400

In embodiments in which the virtual image 400 provides an interactive tab to the user 310, the user 310 may select the virtual image 400 by any conventional means for interaction with the mobile device 200. For instance, in some embodiments, the user 310 may utilize an input device 240 such as a keyboard to highlight and select the virtual image 400 in order to retrieve the information. In a particular embodiment, the mobile device display 230 includes a touch screen that the user may employ to select the virtual image 400 utilizing the user's finger, a stylus, or the like.

In some embodiments, and depending on the nature of the user (i.e. customer of a financial institution, merchant etc.), selecting the virtual image 400 will cause the AR application 221 to present the user 310 with the opportunity to take a specific action, such as contacting (via e-mail, chat, phone call etc.) the issuing financial institution, viewing transaction data relating to the account associated with the financial document, verifying sufficient funds to cover the amount specified in the financial document, visually comparing the endorsement on a check to an image file of a signature associated with the account, pull up additional information about a payee, authorizing a payment, approving a transfer of funds, etc.

In some embodiments, the virtual image 400 is not interactive and simply provides information to the user 310 by superimposing the virtual image 400 onto the display 230. For example, in some instances it may be beneficial for the AR application 221 to merely identify an object 320, so the user 310 has a visual indication that the mobile device 200 has captured an image that may be used to process the financial document 360, rather than provide extensive detail that requires interaction with the virtual image 400. The mobile device 200 is capable of being tailored to a user's desired preferences.

The virtual image 400 may be displayed at any size on the mobile device display 230. The virtual image 400 may be small enough that it is positioned on or next to the object 320 being identified such that the object 320 remains discernable behind the virtual image 320. Additionally, the virtual image 400 may be semi-transparent such that the object 320 remains discernable behind the virtual image. In other embodiments, the virtual image 400 may be large enough to completely cover the object 320 portrayed on the display 230. Indeed, in some embodiments, the virtual image 400 may cover a majority or the entirety of the mobile device display 230.

The user 310 may opt to execute the object recognition application 225 and AR application 221 at any desired moment and begin video capture and analysis. However, in some embodiments (e.g. in situations where images of a number of financial documents are being captured over an extended period of time, such as in a retail environment), the object recognition application 225 and AR application 221 include an "always on" feature in which the mobile device 200 is continuously capturing video and analyzing the objects 320 within the video stream. In such embodiments, the object recognition application 225 may be configured to alert the user 310 that an insufficient number of objects 320 have been identified to process the financial document 360 or that a particular object 320 (e.g. payor information from an individual that has previously been associated with a check requiring further inquiry) has been identified. The user 310 may set any number of user preferences to tailor the object recognition experience 300 to their needs. Additionally, it will be appreciated that the "always on" feature in which video is continuously captured may consume the mobile device power source 215 more quickly. Thus, in some embodiments, the "always on" feature may disengage if a determined event occurs such as low power source 215, low levels of light for an extended period of time (e.g., such as if the mobile device 200 is in a user's pocket obstructing a clear view of the environment 350 from the mobile device 200), if the mobile device 200 remains stationary (thus receiving the same video stream) for an extended period of time, the user sets a certain time of day to disengage, etc. Conversely, if the "always on" feature is disengaged due to the occurrence of such an event, the user 310 may opt for the "always on" feature to re-engage after the duration of the disengaging event (e.g., power source 215 is re-charged, light levels are increased, etc.).

In some embodiments, the user 310 may identify objects 320 that the object recognition application 225 does not identify and add it to the data storage 271 with desired information in order to be identified and/or displayed in the future. For instance, the user 310 may select an unidentified object 320, such as initials entered above a correction within a financial document, and enter information associated with the object 320 to be saved in the data storage 271 for future use by the object recognition application 225. Furthermore, in cases where the object information is within the data storage 271, but the object recognition application 225 fails to identify the object 320 (e.g., the financial instrument is smudged or damaged making a quality image capture difficult or the marker 330 simply was not identified), the user 310 may select the object 320 and associate it with an object 320 already stored in the data storage 271. In such cases, the object recognition application 225 may be capable of updating the markers 330 for the object 320 in order to identify the object in future real-time video streams.

In some embodiments, the processor 210 may also be capable of operating one or more applications, such as one or more applications functioning as an artificial intelligence ("AI") engine. The processor 210 may recognize objects that it has identified in prior uses by way of the AI engine. In this way, the processor 210 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments the AI engine recognizes an object that has been recognized before and stored by the AI engine. The AI engine may then communicate to another application or module of the mobile device, an indication that the object may be the same object previously recognized. In this regard, the AI engine may provide a baseline or starting point from which to determine the nature of the object. In other embodiments, the AI engine's recognition of an object is accepted as the final recognition of the object.

In addition, in some embodiments, the user 310 may opt to edit the information or add to the information provided by the virtual image 400. For instance, the user 310 may opt to include user-specific information about a certain object 320 such that the information may be displayed upon a future identification of the object 320. For instance, the user 310 may add a note associated with a specific payor that the payor has previously forged financial documents or presented false identification information, so that this information is provided in the future if the mobile device 200 captures an image of a financial document with that individual as the payor. Conversely, in some embodiments, the user 310 may opt to delete or hide an object 320 from being identified and a virtual image 400 associated therewith being displayed on the mobile device display 230. For instance, if the user is capturing images of a number of financial documents known to have issued from a certain financial institution, the user 310 may hide any object 320 identifying the issuing financial institution so as not to crowd the display 230.

FIG. 5 illustrates a flow diagram of a process flow for a computer-implemented method 500 for recognizing financial document images, in accordance with embodiments of the invention. As shown in FIG. 5, in some embodiments, steps in the computer-implemented method 500 are performed by the user of a mobile device, the mobile device, and/or the financial institution server. The computer-implemented method 500 allows the user to capture a real-time video stream of a financial document, analyze and correlate images of the financial document to the images needed to process the financial document, interact with the identified images, receive notice of additional images needed to process the financial document and communicate information about the financial document to a financial institution to complete a transaction.

As represented by block 510, the user presents one or more financial documents (e.g. a check, deposit slip, currency etc.). At block 520, the mobile device captures a real-time video stream of the financial document. In an exemplary embodiment, the user operates a mobile smartphone with a built in camera to capture the real-time video stream. The video may be displayed concurrently in a display on the mobile device or the video may be streamed to another device for display. As previously discussed, in some embodiment, the real-time video stream is always on, or on until the battery reaches a pre-determined level. In some embodiments, the user will be required to authenticate himself or herself as an authorized user before the mobile device, object recognition application 225 and/or AR application 221 will operate. In some instances the authentication will be in the form of a password, finger swipe pattern, challenge question etc. The authentication may also be taken from the user's biometric data such as an iris scan, palm print, fingerprint, or the like. This biometric information may be collected directly by the mobile device or by a suitable collection apparatus or system operatively connected to the mobile device. This authentication step may be required at one or more of the steps described in process flow 500 and discussed below, including capturing a real-time video stream 520, presenting indicators of identifying images to a display 540 and communicating instructions to a financial institution 590.

In block 530, the mobile device analyzes the real-time video stream to identify images of the financial document that may be used to process the financial document. In some instances, the information or image needed to process a financial document is set by the receiving financial institution and the amount, nature, quality, type etc. of images that must be captured to process the financial document will be unique to the financial institution. The information necessary to process a financial document may also be set by law, regulation, standards organizations, industry best practices etc. In some embodiments, the information relating to what images are required to process a financial document will be stored in a memory that is accessible to the mobile device (e.g. memory 220). In other embodiments, this information will be dynamically collected, for instance from a website or intranet. In some embodiments, the user will be presented with the opportunity to identify the type of financial document being scanned, e.g. identifying it as money order or share, and thereby determine the images needed to process the financial document. In other embodiments, the object recognition application 225, or another application will identify the type of financial document directly from the captured image. For instance, the object recognition application 225, may identify the MICR lines, or similarly standardized images, and identify the financial document as a check. This identification will not only indicate the nature, quality and type of images that needs to be captured to process the document but may direct the application to other areas of the document with images that may be relevant to processing the document, e.g. if the object recognition application 225 identifies the document as a check, it can automatically look for a check amount number, payor information etc.

As represented by block 540, in certain embodiments, the mobile device will present on a display, one or more indicators, each indicator being associated with an image that may be used to process the financial document. In certain embodiments, such indicators will take the form of a virtual image 400, as discussed herein. In other embodiments, the indicators will take the form of a status bar, image painting, percentage indicator, or the like indicating the amount of images collected as compared to the number of images remaining to be collected before the financial document may be processed. As shown in block 550, the user in some instances, will be able to interact with the indicators presented on the display. In some embodiments, the user will be able to select an indicator to gather additional information relating to the image. For instance, if an indicator associated with a payee is presented, the user can select the indicator and additional information about the payee may be presented on the display or selecting the indicator may take the user to a website associated with the payee. By way of another example, in use, a merchant may be presented with a check in connection with a retail transaction. The merchant can use the present invention to capture an image of the check with a mobile device, such as a hand held scanner that is connected to a display. In addition to being able to determine when sufficient images of the check have been captured to process the check, the merchant may be presented on the display an indicator associated with the check amount. The merchant may be able to select that indicator and receive an indication from the financial institution from which the check is drawn as to whether the balance in the customer's account will cover the amount of the check. As yet another example, a user may capture an image of an invoice and an indicator or indicators may appear to indicate sufficient images of the invoice of have been captured to arrange for payment of the invoice by the user's financial institution (e.g. the issuer's name and address, the amount due, an invoice number, the user's account number, etc.). The user may be able to select one such indicator to authorize a one time payment of the invoice. The user may also be able to select an indicator associated with the image of the invoice to set up recurring payments to the issuer of the invoice.

In block 560, the mobile device correlates the collected images of the financial document to the information needed to process the financial documents. As previously discussed, the information needed to process the financial documents may be set by law, regulation, policy, procedure, best practices etc. If the mobile device determines that additional images are needed to collect sufficient information to process the financial document, as represented by block 570, the mobile device provides notice to the user that additional images are needed. Such notice may consist of specific instructions of what images need to be captured or merely indicate that the user needs to capture additional images in order to process the financial document. In use, lighting, shadows, wrinkles, smudges or other defects in the document etc. as well as camera angle, distance from the financial document etc. may inhibit the mobile device from capturing a sufficient image of the financial document to identify all information necessary to process the document. By capturing a video stream and moving the mobile device around the financial document to different quadrants of the document, tilting the camera at different angles, zooming in and/or out from the financial document the mobile device will capture a fuller image of the financial document. The processor of the mobile device can analyze the images captured and determine what aspects of the image may be enhanced (e.g. insufficient pixels have been captured as compared to a test image or quality standard), and what actions of the user may be done to capture the necessary images. For example, if the user is at such an angle to the financial document that the image capture device is only getting a good image of the left half of the document, the mobile device may notify the user that it needs to move the image capture device to the right in order to capture the additional images needed to process the financial document. At block 580, the user adjusts the mobile device to capture the additional images and the flow 500 of recognizing financial document images moves back to analyzing the real-time video stream to identify images that may be used to process the financial document at block 530 and proceeds on until there are no additional images that are required to process the financial document.

As represented by block 590, once sufficient images of the financial document have been captured to process the financial document, the mobile device communicates the necessary information to a financial institution. The communication of the information to the financial institution may occur automatically after sufficient images have been captured. Alternatively, in some embodiments, the user 310 will receive notification that sufficient images have been captured and may be required to affirmatively instruct the AR application, mobile device etc. to communicate the necessary information to the financial institution, for example by swiping or tapping the image of the financial document or actuating an indicator or other button presented on the display 230. In some embodiments, communicating information to a financial institution will include encrypting the data, or the like, before it is transmitted to the financial institution in order to protect the information from being intercepted during transmission.

In some embodiments, communicating the information associated with the financial document to a financial institution 590 may involve the transfer of the actual image of the financial document captured by the mobile device to the financial institution. In such embodiments, the user manipulates the mobile device capturing images of the financial document and the mobile device sends a high quality image of the financial document (e.g., a still frame of the real-time video with the most complete image of the financial document) or compiles the captured pixels from multiple images into a single image of the financial document. In other embodiments, the mobile device will use the capture of the real-time video stream to recognize information from the financial document and use this information to create a substitute image, such as an enhanced payment order, that correlates to the information in the financial document. In such embodiments, the mobile device will combine recognized data from the real-time data stream with image data to create a clearer image. For instance, if the mobile device captures the image of a handwritten check, the mobile device may recognize the payment amount and the payee from the handwriting on the check and create a substitute image wherein this information appears in typed text and numbers rather than in the original handwritten form. In such embodiments, the substitute image may then be communicated to the financial institution for completion of the transaction.

As shown in block 595, the financial institution processes the transaction embodied by the financial document. For example, if a customer of a financial institution used an embodiment of the invention to deposit a paycheck, the customer might scan her paycheck with a mobile device (e.g. a mobile phone) until the object recognition application and/or AR application was able to collect an image of the amount, payor name, payor account information, issuing financial institution routing number and a verified signature. The customer may then also scan a deposit slip issued by the financial institution filled out to deposit the amount of the paycheck into a savings account. In some embodiments, the user may scan a blank deposit slip issued by the financial institution and the mobile device may present indicators in the available fields of the deposit slip that the user can interact with to enter the necessary deposit information using the mobile device. In yet other embodiments, after the deposit slip is scanned the application may populate the identified fields in the deposit slip with the appropriate information from the paycheck. Also, a blank deposit slip may have been previously scanned by the user and stored in the memory of the mobile device so that it is not necessary to scan a new blank deposit slip to complete a transaction. At some point, the mobile device may indicate to the user that she needs to scan an image of the endorsement of the paycheck before the documents can be processed. The user captures a video of the endorsement on the check and the mobile device communicates the images to the financial institution, which in turn deposits the amount of the paycheck into the user's account. In another example a user may use the mobile device to scan a statement issued by a credit card company. The user manipulates the mobile device until the mobile device captures sufficient images from the credit card statement to pay the credit card issuer. Such images may include the credit card issuer's name and logo from the top of the statement, the credit card number, the user's name and address, the current balance and minimum payment due and the date the payment must be submitted. While scanning the statement, interactive indicators may appear on the display of the mobile device over the minimum payment and/or current balance allowing the user to select the indicator and pay the associated amount (i.e. the minimum balance or current balance). The mobile device may then communicate the collected information about the credit card statement to a financial institution to complete the transfer of funds from the user's account with the financial institution to the credit card issuer.

It should be understood that every step of flow 500 does not need to occur in the order described herein, and in some instances will not occur at all. Different steps in the computer-implemented method can be skipped or moved around and still accomplish the goal of recognizing financial document images. For example, the mobile device may only display indicators associated with images that may be used to process the financial document, block 540, after the mobile devices has captured all of the necessary images. Accordingly, the steps disclosed herein are not limiting to the exact order discussed.

Referring now to FIGS. 6 and 7, a series of exemplary display pages 600 and 700 of a mobile device 200 consistent with an embodiment of the present invention are provided. It will be understood, that in some embodiments, each of the pages 600 and 700 are displayed on the display 230 of the mobile device 200. It will also be understood that the mobile device 200 is configured, in some embodiments to navigate from page 600 to page 700 and/or vice versa either by actuating one of the buttons 605,705 or one of the other input devices 240. It will be further understood that the display pages 600 and 700 can be embodied as portions of the AR Application 221, as Internet web pages and/or the like. In addition, it will be understood that, in some embodiments, the apparatus having the process flow 100 and 500 are configured to implement any one or more of the embodiments of the present invention described and/or contemplated herein in connection with the display pages 600 and 700.

Referring now to FIG. 6, it will be understood that in some embodiments, the display page 600 is displayed in connection with presenting one or more indicators associated with an image that may be used to process a financial document, as represented by block 540 of an apparatus having a process flow 500 and/or in connection with providing notice to a user of additional images needed to process the financial document as represented by block 140 of an apparatus having a process flow 100. Alternatively, the display page 600 is displayed after the user navigates to the page from another display page, e.g. 700. As shown, in this embodiment, the display page 600 includes an image painting 610 (i.e. visual reproduction of the amount and quality of the image collected), and indicator 620 of the percentage of the completed image capture and instructions 630 for capturing the additional images needed to complete the image capture to a sufficient degree to process the financial document. As illustrated, the user has only captured 47% of the images necessary to process the financial document 620. The mobile device is also prompting the user to move the camera to the right and tilt the camera towards and away from the financial document to capture additional images 630.

Referring now to FIG. 7, the display page 700, in some embodiments is displayed in connection with presenting one or more indicators associated with an image that may be used to process a financial document, as represented by block 540 of an apparatus having a process flow 500. Referring to FIG. 3, after identifying an object 320 (e.g an endorsement, MICR lines) within the real-time video stream, the mobile device 200, in some embodiments, is configured to superimpose a virtual image 400 on the mobile device display 230. In the embodiment shown in FIG. 8, the display page 800 includes a plurality of virtual images 710-740 superimposed over the image of the financial document 360. The image of the financial document 360, as shown in display page 800, may be a display of the image in the real-time video stream or alternatively may be the completed image painting discussed in references to display page 700. In such embodiments, the user may be able to actuate the virtual images 710-740 to perform certain functions or collect additional information about the identified image. For instance, the user may actuate virtual image 710, which is associated with the routing number of the financial institution from which the financial document is drawn. Actuating virtual image 710 may allow the user to contact the financial institution to inquire about the account, payor, transaction etc. By way of further example, virtual image 730, as shown in display page 800, is associated with the signature line on the financial document 360. By selecting the virtual image 730, the user may be presented with a side by side comparison of the signature on the financial document and a signature file associated with the account enabling the user, the AR application, or the like to compare the two signatures. Similarly, actuating the virtual image 730 may present information about the signatory collected from customer data held by financial institution. In yet another example, virtual image 720 is associated with the payor information. If a merchant submitted the financial document for payment from the payor's financial institution but the check exceeded the balance in the customer's account, the merchant may be able to use the mobile device to scan the financial document and generate automatic communications to the payor by selecting the virtual image 720. Similarly, a merchant may be able to actuate the virtual image 720 to collect additional information about the payor, such as a driver's license number, phone number, membership in the merchant's loyalty program etc. to further validate the check. Such information may be collected from data maintained by the merchant or from a financial institution or vendor with which the merchant partners to validate its checks. As yet one further example, in some embodiments, the user may be able to determine whether the balance of the account associated with the financial document is greater than the amount involved in the transaction by selecting the virtual image 740. In other embodiments, the virtual image 740 will automatically present this information without the user having to select the virtual image. For instance, the virtual image 740 associated with the check amount may be displayed as green if the account has sufficient funds and red if there are insufficient funds.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
| --- | --- | --- |
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for processing financial documents using real-time video analysis by capturing a real-time video stream using a mobile device, wherein the video stream features one or more financial documents, comprising:
    capturing, via a mobile device, a real-time video stream that includes images of a financial document;
    determining, using a positioning system device, a location of a user associated with the financial document;
    identifying a type for the financial document based at least in part on the location of the user;
    identifying information that must be determined prior to processing the financial document based on the type for the financial document, wherein the information is disclosed on the financial document and is used by a financial institution to route funds associated with the financial document;
    analyzing, via a processor, the real-time video stream to identify one or more objects comprising information that is used to process the financial document;
    comparing the objects from the financial document to the information needed to process the financial document;
    determining that more information from the financial document is needed in order for the financial institution to process the financial document based on the type;
    determining at least one part of the financial document containing objects that have not yet been analyzed based on the information that is needed;
    providing a notice to a user of additional images needed to process the financial document, wherein the notice provided to the user comprises instructions to the user of how to manipulate the mobile device to capture the objects on the financial document comprising the information that is needed; and
    communicating the information associated with the financial document to a financial institution to complete a transaction once sufficient images of the financial document have been captured to process the financial document.

2. The method of claim 1, wherein the financial document is a check, cash, draft, bond, share, bill of exchange, future, option, money order, promissory note, deposit slip, security, invoice or statement.

3. The method of claim 1, wherein the transaction is a deposit, transfer, sale, payment or exchange.

4. The method of claim 1, further comprising presenting one or more indicators via a display of the mobile device, each indicator being associated with an image that may be used to process the financial document.

5. The method of claim 4, wherein the one or more indicators are interactive allowing the user to access additional information associated with the images.

6. The method of claim 4, wherein the one or more indicators are a representation of the amount of images captured as compared to the number of images remaining to be captured before the financial document may be processed.

7. The method of claim 4, wherein the one or more indicators are interactive allowing the user to take an action using the information associated with the image.

8. The method of claim 7, wherein the action is selected from one of making a payment, transferring funds to a financial institution or depositing funds with a financial institution.

9. The method of claim 1, further comprising the step of creating a substitute image using the captured images of the financial document and wherein communicating the information associated with the financial document to a financial institution comprises communicating the substitute image to the financial institution to complete a transaction.

10. The method of claim 9, wherein the substitute image is an enhanced payment order.

11. An apparatus for processing financial documents using real-time video analysis by capturing a real-time video stream using a mobile device, wherein the video stream features one or more financial documents, the apparatus comprising:
    a device for capturing a real-time video stream of a user's environment, the video stream including images of a financial document;
    a positioning system device;
    a display operably connected to the device; and
    a processor operably connected to the device and the display and configured to:
        capture the real-time video stream of the user's environment, the real-time video stream comprising images of a financial document;
        determine, using the positioning system device, a location of the user associated with the financial document;
        identify a type for the financial document based at least in part on the location of the user;
        identify information that must be determined prior to processing the financial document based on the type for the financial document, wherein the information is disclosed on the financial document and is used by a financial institution to route funds associated with the financial document;
        analyze the real-time video stream to identify one or more objects comprising information that is used to process the financial document;
        compare the objects from the financial document to the information needed to process the financial document;
        determine that more information from the financial document is needed in order for the financial institution to process the financial document based on the type;
        determine at least one part of the financial document containing objects that have not yet been analyzed based on the information that is needed;
        provide a notice to the user of additional images needed to process the financial document, wherein the notice provided to the use comprises instructions to the user of how to manipulate the mobile device to capture the objects on the financial document comprising the information that is needed; and
    a communication device, operably connected to the processor for communicating the information associated with the financial document to a financial institution to complete a transaction once sufficient images of the financial document have been captured to process the financial document.

12. The apparatus of claim 11, wherein the financial document is a check, cash, draft, bond, share, bill of exchange, future, option, money order, promissory note, deposit slip, security, invoice or statement.

13. The apparatus of claim 11, wherein the device is a mobile device.

14. The apparatus of claim 11, wherein the transaction is a deposit, transfer, sale, payment or exchange.

15. The apparatus of claim 11, wherein the processor is further configured to present one or more indicators via the display, each indicator being associated with an image that may be used to process the financial document.

16. The apparatus of claim 15, wherein the one or more indicators are interactive allowing the user to access additional information associated with the images.

17. The apparatus of claim 15, wherein the one or more indicators are a representation of the amount of images captured as compared to the number of images remaining to be captured before the financial document may be processed.

18. The apparatus of claim 15, wherein the one or more indicators are interactive allowing the user to take an action using the information associated with the image.

19. The apparatus of claim 18, wherein the action is selected from one of making a payment, transferring funds to a financial institution or depositing funds with a financial institution.

20. The apparatus of claim 11, wherein the processor is further configured to create a substitute image using the captured images of the financial document and wherein communicating the information associated with the financial document to a financial institution comprises communicating the substitute image to the financial institution to complete a transaction.

21. The apparatus of claim 20, wherein the substitute image is an enhanced payment order.

22. A computer program product for processing financial documents using real-time video analysis by capturing a real-time video stream using a mobile device, wherein the video stream features one or more financial documents, comprising:
   a non-transitory computer-readable medium having computer-executable code stored thereon, the computer executable code comprising:
      a code portion stored in the memory and configured to capture, via a mobile device, a real-time video stream that includes images of a financial document;
      a code portion stored in the memory and configured to determine, using a positioning system device, a location of a user associated with the financial document;
      a code portion stored in the memory and configured to identify a type for the financial document based at least in part on the location of the user;
      a code portion stored in the memory and configured to identify information that must be determined prior to processing the financial document based on the type for the financial document, wherein the information is disclosed on the financial document and is used by a financial institution to route funds associated with the financial document;
      a code portion stored in the memory and configured to analyze the real-time video stream to identify one or more objects comprising information that is used to process the financial document;
      a code portion stored in the memory and configured to compare the objects from the financial document to the information needed to process the financial document;
      a code portion stored in the memory and configured to determine that more information from the financial document is needed in order for the financial institution to process the financial document based on the type;
      a code portion stored in the memory and configured to determine at least one part of the financial document containing objects that have not yet been analyzed based on the information that is needed;
      a code portion stored in the memory and configured to provide a notice to a user of additional images needed to process the financial document, wherein the notice provided to the use comprises instructions to the user of how to manipulate the mobile device to capture the objects on the financial document comprising the information that is needed; and
      a code portion configured to communicate the information associated with the financial document to a financial institution to complete a transaction once sufficient images of the financial document have been captured to process the financial document.

23. The computer program product of claim 22, wherein the financial document is a check, cash, draft, bond, share, bill of exchange, future, option, money order, promissory note, deposit slip, security, invoice or statement.

24. The computer program product of claim 22, wherein the transaction is a deposit, transfer, sale, payment or exchange.

25. The computer program product of claim 22, further comprising a code portion stored in the memory and configured to present one or more indicators via a display, each indicator being associated with an image that may be used to process the financial document.

26. The computer program product of claim 25, wherein the one or more indicators are interactive allowing the user to access additional information associated with the images.

27. The computer program product of claim 25, wherein the one or more indicators are a representation of the amount of images captured as compared to the number of images remaining to be captured before the financial document may be processed.

28. The computer program product of claim 25, wherein the one or more indicators are interactive allowing the user to take an action using the information associated with the image.

29. The computer program product of claim 28, wherein the action is selected from one of making a payment, transferring funds to a financial institution or depositing funds with a financial institution.

30. The computer program product of claim 22, further comprising a code portion stored in the memory and configured to create a substitute image using the captured images of the financial document and wherein communicating the information associated with the financial document to a financial institution comprises communicating the substitute image to the financial institution to complete a transaction.

31. The computer program product of claim 30, wherein the substitute image is an enhanced payment order.

* * * * *